(12) United States Patent
Ishihara et al.

(10) Patent No.: US 6,741,391 B1
(45) Date of Patent: May 25, 2004

(54) THREE-DIMENSIONAL OBJECT OBSERVING MICROSCOPE

(75) Inventors: Eiji Ishihara, Tokyo (JP); Shinsuke Hiraoka, Kanagawa (JP); Yuji Ikegami, Kanagawa (JP); Takashi Mizusawa, Kanagawa (JP); Tozaburo Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/561,939

(22) Filed: May 1, 2000

(30) Foreign Application Priority Data

May 6, 1999 (JP) .......................... P11-126113

(51) Int. Cl.[7] .................. G02B 21/00; G02B 21/18
(52) U.S. Cl. .................. 359/372; 359/363; 359/369; 359/391; 359/380; 359/368; 359/432
(58) Field of Search .................. 359/372, 369, 359/368

(56) References Cited

U.S. PATENT DOCUMENTS

| | | | | |
|---|---|---|---|---|
| 4,226,534 A | * | 10/1980 | Kuck | .......................... 356/246 |
| 4,299,439 A | * | 11/1981 | Stromblad | .................. 359/384 |
| 4,742,947 A | | 5/1988 | Coffman et al. | |
| 5,253,106 A | * | 10/1993 | Hazard | ........................ 359/368 |
| 5,668,660 A | * | 9/1997 | Hunt | .......................... 359/363 |
| 6,005,964 A | * | 12/1999 | Reid et al. | ..................... 378/42 |
| 6,452,625 B1 | * | 9/2002 | Kapitza | ........................ 348/80 |
| 2003/0103277 A1 | * | 6/2003 | Mohwinkel | ................. 359/811 |

FOREIGN PATENT DOCUMENTS

| | | | |
|---|---|---|---|
| JP | 404097311 | * | 3/1992 |
| JP | 411271644 | * | 10/1999 |
| JP | 200083184 | * | 3/2000 |

* cited by examiner

*Primary Examiner*—John R. Lee
*Assistant Examiner*—James J. Leybourner
(74) *Attorney, Agent, or Firm*—Sonnenschein, Nath & Rosenthal LLP

(57) ABSTRACT

There is provided a three-dimensional object observing microscope which can easily observe a three-dimensional object in a three-dimensional manner. A three-dimensional object observing microscope comprising a table on which a three-dimensional object is placed, an imaging part which consists of an imaging lens and an imaging camera for imaging this three-dimensional object from an inclined upper position, and a casing which supports the imaging part rotatably in a horizontal direction and also integrally supports the table and the imaging part.

17 Claims, 11 Drawing Sheets

THREE-DIMENSIONAL OBJECT OBSERVING MICROSCOPE

STATEMENT OF RELATED APPLICATIONS

This application claims priority to Japanese patent application serial no. JP P11-126,113, filed on May 6, 1999.

BACKGROUND OF THE INVENTION

Field of the Invention

The present invention relates to a three-dimensional object observing microscope for observing a three-dimensional object in a three-dimensional manner.

In the related art, in general, in observing a three-dimensional object, especially a microscopic three-dimensional object, such a microscopic object is observed from right above the object with the use of a microscope.

Therefore, it is difficult to carry out the observation of the microscopic three-dimensional object in a three-dimensional manner and hence, it is substantially impossible to grasp the three-dimensional shape.

To the contrary, in case the microscopic three-dimensional object is observed from an oblique upper position, it is possible to observe the microscopic three-dimensional object in a three-dimensional manner. However, in such an observation with the use of the related microscope or the like, it is necessary to arrange the microscopic three-dimensional object which constitutes an object to be observed in an oblique manner. Therefore, depending on the magnification of a lens used by the microscope, the focusing with respect to the microscopic three-dimensional object becomes difficult due to the difference of focusing distance or the narrow depth of field and hence, the observation of the microscopic three-dimensional object from the upper oblique position is substantially difficult.

Further, in the observation with the use of the microscope, only one person which uses the microscope is capable of observing and hence, it is difficult to transmit information obtained at the time of observation to others.

On the other hand, a method where the microscopic three-dimensional object is placed on the table, this microscopic three-dimensional object is imaged by an image camera by way of an image lens and then an image imaged by the imaging camera is displayed on a display screen may be considered.

Due to such a constitution, the microscopic three-dimensional object is imaged by the image camera by way of the image lens from an upper oblique position and then the image is displayed on the display screen so that the three-dimensional observation of the microscopic three-dimensional object from the upper oblique position becomes possible and the observation by a plurality of persons also becomes possible.

In the observation of the microscopic three-dimensional object which uses such imaging lens and the imaging camera, the imaging lens, the imaging camera and the display are individually commercially available and hence, they can be easily obtained. However, to constitute an observing apparatus by combining these parts, it is necessary to firmly hold the imaging lens and the imaging camera to image the microscopic three-dimensional object and a table is also necessary to hold the microscopic three-dimensional object. Accordingly, there have been problems such that the preparation of the observation takes time and the preparation to move the observing device which has been installed also takes time.

Further, since the display constitutes a separate body, in case a viewer carries out various operations while watching the image of the microscopic object displayed on the display screen, the movement of the line of sight of the viewer becomes large thus deteriorating the operability.

Further, in case the magnification of the imaging lens is high, the higher the magnification, the narrower the field of vision of the observation becomes and hence, it becomes difficult to arrange the microscopic three-dimensional object within the field of vision of the observation. Particularly, in observing the microscopic three-dimensional object which is formed by arranging same parts such as mounting boards or the like or the microscopic three-dimensional object which is constituted by repeating the same pattern, it is difficult to grasp the actual observation position.

OBJECTS AND SUMMARY OF THE INVENTION

In view of the above, it is an object of the present invention to provide a three-dimensional object observing microscope which is capable of readily observing a three-dimensional object in a three-dimensional manner.

The above-mentioned object is achieved by a three-dimensional object observing microscope being characterized by comprising a table on which a three-dimensional object is placed, an imaging part which includes an imaging lens and an imaging camera for imaging the three-dimensional object from an upper oblique position, and a casing which supports the imaging part rotatably in a horizontal direction and also integrally supports the table and the imaging part.

Due to the above-mentioned constitution, with respect to the three-dimensional object placed on the table, by imaging the three-dimensional object from an upper oblique position by the imaging part, the three-dimensional object can be readily observed in a three-dimensional manner.

In this case, since the table and the imaging part are integrally supported by the casing, the preparation for observation becomes unnecessary and the observation can be carried out promptly, and in case the three-dimensional object observing microscope is to be moved to other place, the whole three-dimensional object observing microscope can be readily moved and the observation can be carried out promptly at the moved place.

DESCRIPTION OF THE PREFERRED EMBODIMENTS

Preferred embodiments of the present invention are explained in detail in conjunction with FIG. 1 to FIG. 14.

Although various technically preferable limitations are made with respect to the embodiments explained hereinafter since they are preferred examples of the present invention, the scope of the present invention is not limited to these embodiments unless there are descriptions which specifically limit the present invention in the following explanation.

Figure 1:
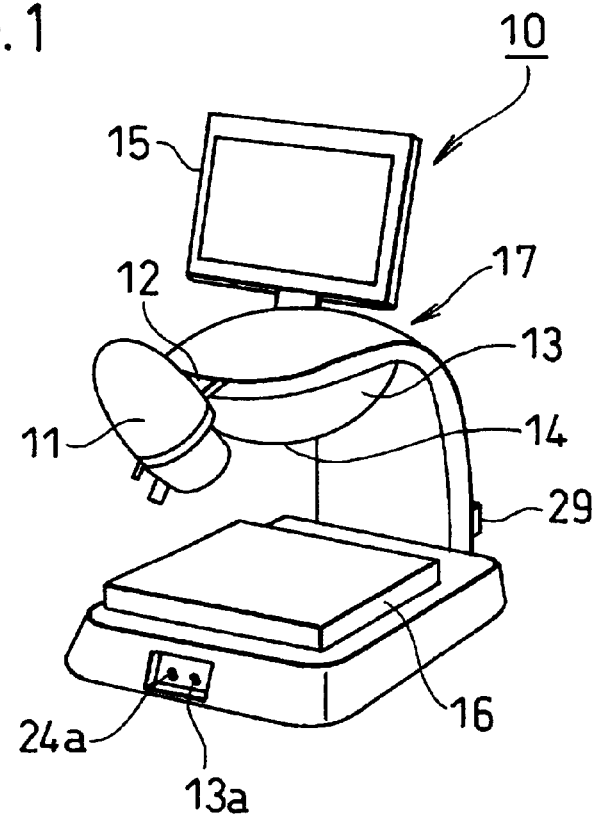
FIG. 1 is a schematic perspective view showing the whole constitution of a microscopic three-dimensional object observing microscope according to an embodiment of the present invention.
Figure 2:
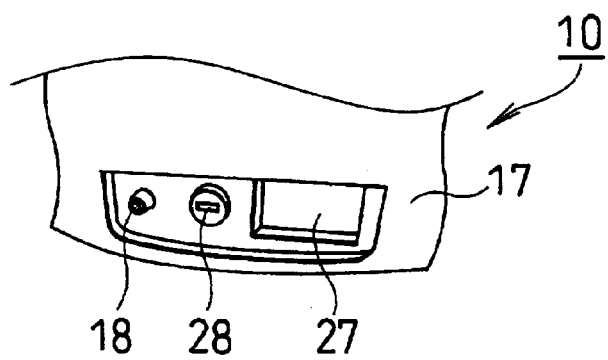
FIG. 2 is a partially enlarged perspective view showing a part of a back surface of the microscopic three-dimensional object observing microscope of FIG. 1.

FIG. 1 and FIG. 2 show a microscopic three-dimensional object observing microscope which is an embodiment of the three-dimensional object observing microscope of the present invention.

In FIG. 1 and FIG. 2, the microscopic three-dimensional object observing microscope 10 includes an imaging part 11, a camera horizontally rotating part 12 as a rotating mechanism, a fluorescent lighting device 13 as lighting means, a laser pointer 14, a liquid crystal display monitor 15 as a display part, an XY table 16, a casing 17 and an output terminal 18.

Figure 3:
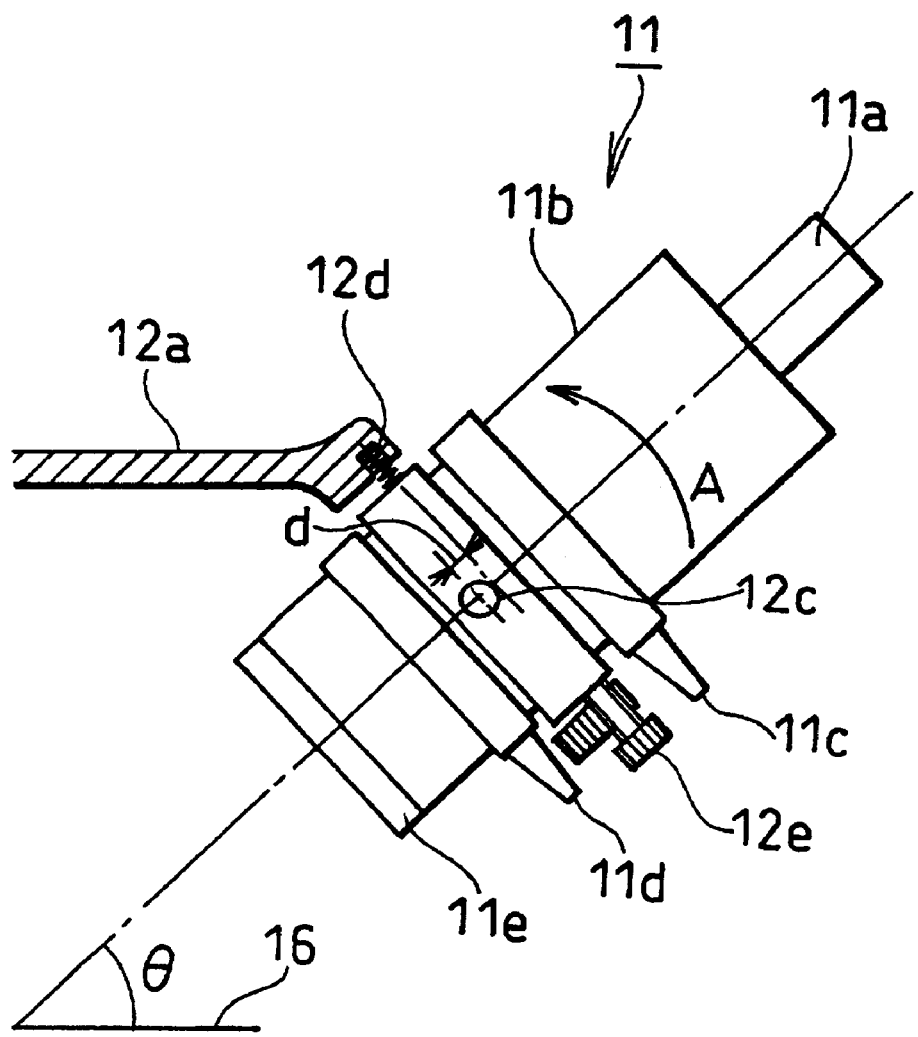
FIG. 3 is an enlarged cross-sectional view showing an imaging part of the microscopic three-dimensional object observing microscope of FIG. 1.
Figure 4:
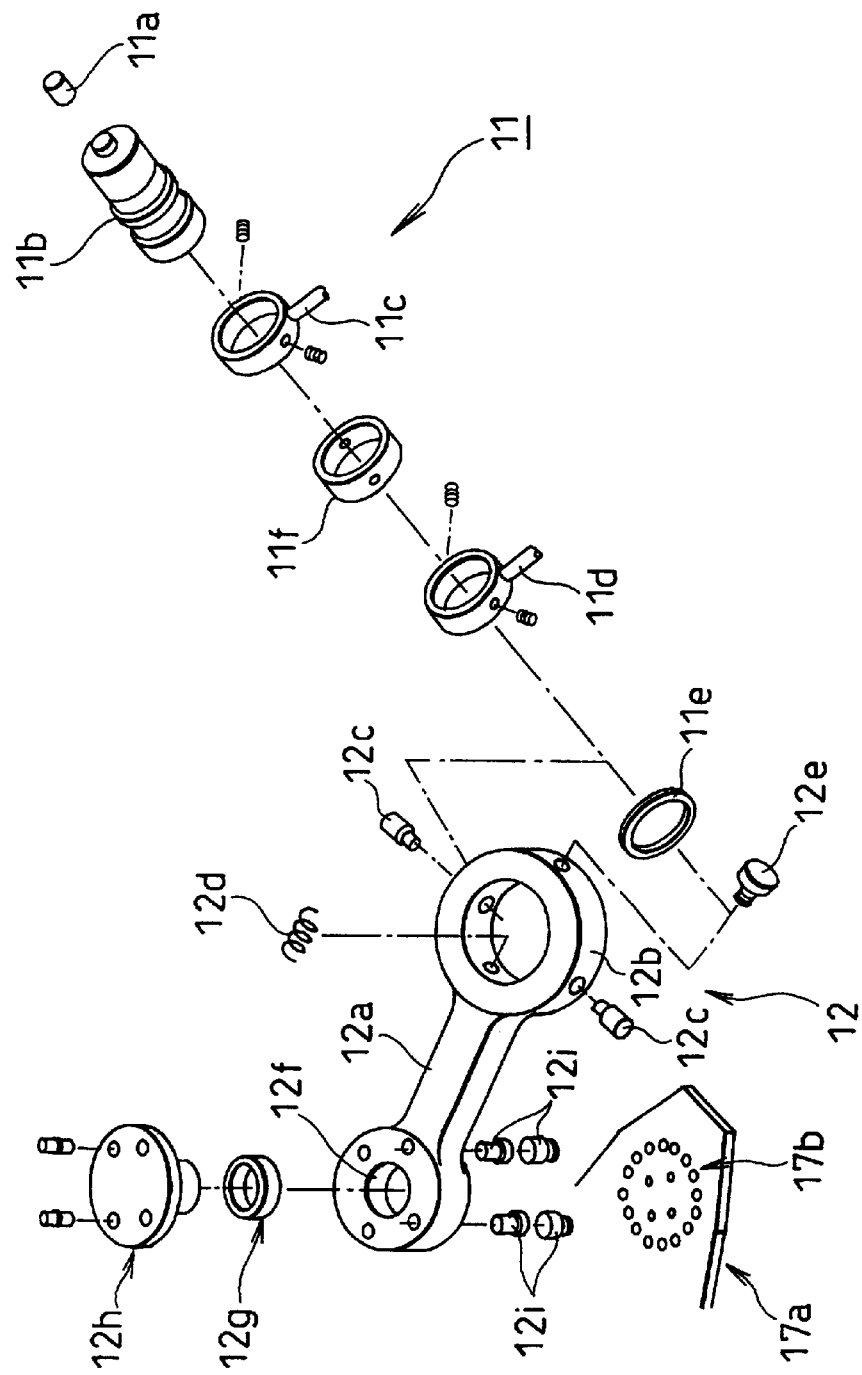
FIG. 4 is an exploded perspective view of an imaging part and a camera horizontally rotating part in the microscopic three-dimensional object observing microscope of FIG. 1.

As shown in FIG. 3 and FIG. 4, the imaging part 11 is composed of a CCD (solid-state image sensing device) camera 11a, a macro zoom lens 11b as an imaging lens, a zoom adjustment levers 11c and a focusing adjustment lever 11d which are respectively attached to a zoom adjustment ring and a focusing adjustment ring of the macro zoom lens 11b by means of small screws and a protective filter 11e. The imaging part 11 is supported by a lens arm 12a of a camera horizontally rotating part 12.

The CCD camera 11a and the macro zoom lens 11b have known constitutions and those which are commercially available can be As the macro zoom lens 11b, a macro zoom lens having a shortest focusing distance of 150 mm can be used, for example, and hence, a sufficient distance can be assured between a microscopic object 19 (see FIGS. 7A. 7B and 7C) which is a three-dimensional body and the above-mentioned macro zoom lens 11b. Accordingly, various operations related with this microscopic object 19 can be carried out without being obstructed by the macro zoom lens 11b.

Accordingly, by making use of the zoom function of this macro zoom lens 11b, the adjustment is effected such that the microscopic object 19 fully occupies the field of vision of the imaging part 11.

Further, the protective filter 11e is mounted on the distal end of the macro zoom lens 11b for protecting the front most lens of the macro zoom lens 11b. For example, in case a soldering operation is performed with respect to the microscopic object 19 or the like, for example, the lens is protected from the soot of soldering and a high-temperature soldering iron.

By the way, as shown in FIG. 4, the camera horizontally rotating part 12 is provided with a lens arm 12a while a lens supporting part 12b which is formed in an inclined manner is provided to one end (free end) of the lens arm 12a.

Then, with respect to the lens supporting part 12b, as shown in FIGS. 3 and 4, a lens bracket 11f which is fitted on the macro zoom lens 11b is tiltably supported by a support shaft 12c with respect to a horizontal direction under the inclined condition with an inclination angle θ (45 degrees, for example, as shown in FIG. 3). At the same time, the lens bracket 11f has one side (a left upper side in the drawing) thereof brought into contact with the lens ants 12a by way of a spring 12d and the other side (a right lower side in the drawing) supported by way of an adjustment screw 12e.

Here, as shown in FIG. 3, the spring 12d and the adjustment screw 12e are arranged at positions a distance d shifted in an optical axis direction with respect to the support shaft 12c.

Due to such a constitution, by rotating the adjustment screw 12e, the distal end of the adjustment screw 12e pushes and moves the lens bracket 11f of the macro zoom lens 11a against the tension force of the spring 12d and tilts the lens bracket 11f of the macro zoom lens 11b around the support shaft 12c in an arrow direction A (see FIG. 3) or in a reverse direction.

Further, the lens arm 12a has other end thereof horizontally rotatably mounted on a chassis 17a (see FIG. 5) fixedly secured to the casing 17.

Figure 5:
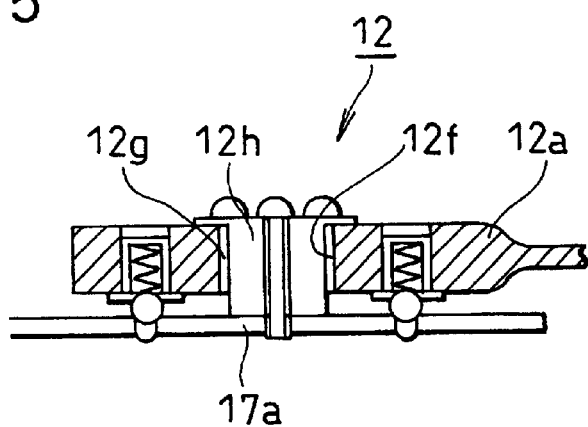
FIG. 5 is a partially enlarged cross-sectional view of a camera horizontally rotating part in the microscopic three-dimensional object observing microscope of FIG. 1.

That is, as shown in FIG. 4 and FIG. 5, a shaft 12h which is provided with an outwardly extending flange at the upper end thereof is fitted into a rotary hole 12f formed in the other end of the lens arm 12a by way of a bushing 12g and this shaft 12h is screwed into the chassis 17a.

Further, the lens arm 12a is provided with a plurality of, four in the drawing, plungers 12i around the rotary hole 12f at an equal angular interval.

These plungers 12*i* have known constitution and are constituted such that balls thereof are protruded downwardly by means of springs.

On the other hand, the chassis 17*a* is provided with a plurality of positioning holes 17*b* which are arranged at an equal angular interval of, for example, 15 degrees, on a circumference which is concentric with the rotary hole 12*f*, wherein these positioning holes 17*b* face the plungers 12*i* in an opposed manner. These positioning holes 17*b* are formed with a diameter slightly smaller than the diameter of balls of the above-mentioned plungers 12*i*.

Figure 6A:
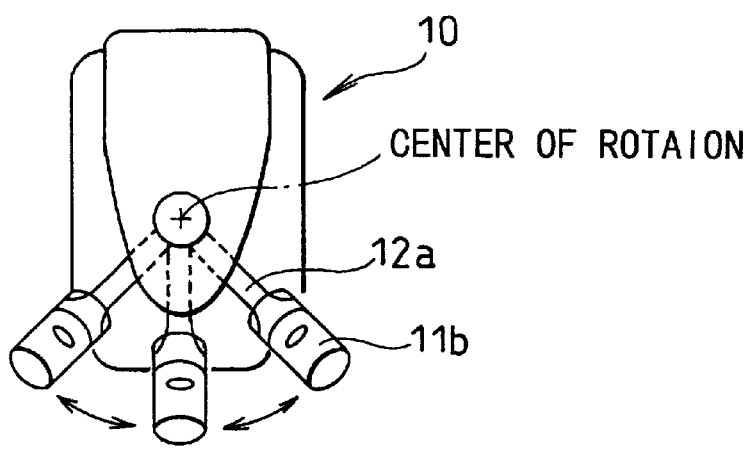
FIG. 6A is a schematic plan view and FIG. 6B is a side view, showing the operation of a camera horizontally rotating part in the microscopic three-dimensional object observing microscope of FIG. 1.

Due to such a constitution, as shown in FIG. 6, the lens arm 12*a* can be rotatably supported within a range of angle of ±45 degrees in a horizontal direction with respect to a chassis 17*a* (see FIG 5).

When this lens arm 12*a* is rotated around the rotary hole 17*b*, the balls of respective plungers 12*i* are fitted into the rotary holes 12*f* due to the tension of the springs. Then, at the time of rotating the lens arm 12*a* horizontally, the lens arm 12*a* is positioned every angular interval of the positioning holes 17*b*.

Figure 6B:
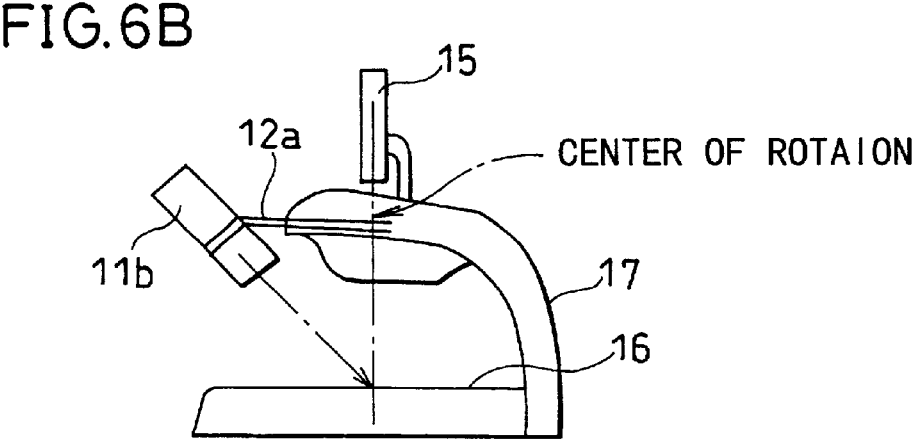

As shown in FIG. 6B, the center of rotation of the lens arm 12*a* is set such that it is positioned on a vertical line from a point of intersection between the optical axis of the macro zoom lens 11*b* and the upper surface of the XY table 16.

As shown in FIG. 1, the fluorescent lighting device 13 is disposed above the XY table and in the inside of the casing 17 and irradiates lighting light to the microscopic object placed on the XY table 16. Accordingly, even in a dark place, the observation of the microscopic object 19 can be carried out with the bright field of vision.

The lighting device is not limited to the fluorescent lamp. So long as lighting light can be irradiated to the microscopic object, other lighting devices can be used. The lighting device may be omitted or an external lighting device may be used.

The laser pointer 14 is integrally incorporated in the inside of the casing 17. For example, a visible light helium neon (He-Ne) red color laser is used as the laser pointer such that laser beams are irradiated downwardly from a position above the rotary shaft of the camera horizontally rotating portion 12.

Figure 7A:
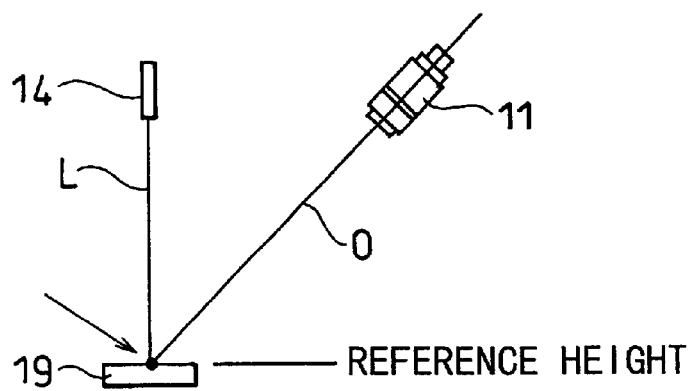
FIGS. 7A to 7C are schematic side views showing a condition (FIG. 7A) where a microscopic object is at the reference height, a condition (FIG. 7B) where the microscopic object is higher than the reference height and a condition (FIG. 7C) where the microscopic object is lower than the reference height with respect to the relationship between a laser pointer and an optical axis of an imaging part in the microscopic three-dimensional object observing microscope of FIG. 1.

Due to such a constitution, as shown in FIG. 7A, when the microscopic body 19 placed on the XY table 16 is at the reference level, an optical axis 0 of the imaging part 11 and the laser beams L irradiated from the laser pointer 14 intersect on the surface of the microscopic object 19.

Figure 7B:
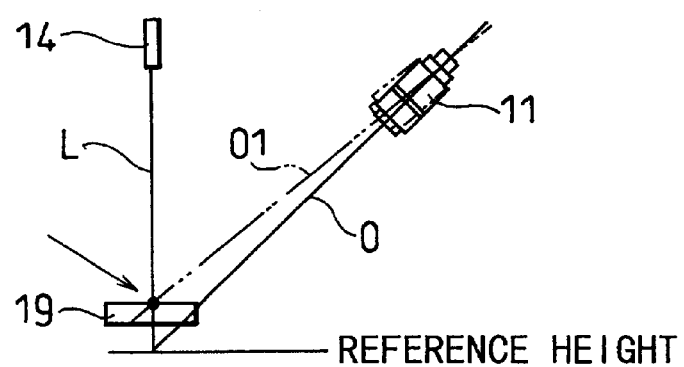

To the contrary, when the height position of the surface of the microscopic object 19 changes, the irradiating position of the laser beams L to the surface of the microscopic object 19 is dislocated from the field of vision of the imaging part 11. As shown in FIG. 7B, however, in case the height position of the surface of the microscopic object 19 is higher than the reference height, by loosening the above-mentioned adjustment screw 12*e*, the optical axis 01 of the imaging part 11 is adjusted to the laser beam irradiating position on the microscopic object 19.

Figure 7C:
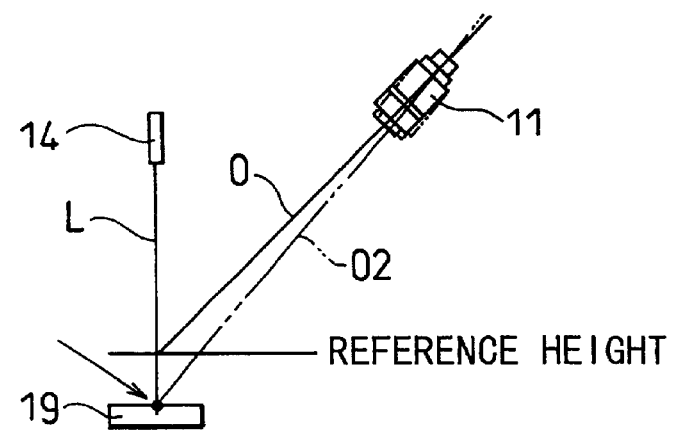

Further, as shown in FIG. 7C, in case the height position of the surface of the microscopic object 19 is lower than the reference height, by tightening the above-mentioned adjustment screw 12*e*, the optical axis 02 of the imaging part 11 is adjusted to the laser beam irradiating position on the microscopic object 19.

Accordingly, by making the laser beams L impinge on the microscopic object 19, the microscopic object 19 can be easily disposed in the field of vision of the imaging part 11 and, during observation, what portion of the microscopic object 19 is observed can be easily grasped by watching the irradiating position of the laser beam L.

A liquid crystal display monitor 15 has a known constitution and is fixedly held above the casing shown in FIG. 1. Accordingly, this liquid crystal display monitor 15 is designed such that the microscopic object 19 displayed on the monitor 15 can be observed by a plurality of persons simultaneously. Further, this liquid crystal display monitor 15 is integrally supported by the casing 17 and hence, when the viewer carries out the operation while observing the microscopic object 19, the movement of the field of vision can be made small and hence, the operability is enhanced.

The liquid crystal display monitor 15 may be constituted separately from the casing 17 or may be omitted.

As shown in FIG. 1, the above-mentioned XY table 16 is movable in biaxial directions on a horizontal plane. For example, at the time of observing the leads of the IC or the connectors, by moving the XY table 16 in one direction, respective leads can be observed in sequence and, at the same time, the fine positioning of the microscopic object 19 can be carried out. Accordingly, the microscopic object 19 placed on the XY table 16 can be easily focused within the field of imaging view of the imaging part 11.

In place of the XY table 16, an XYZ table or a table having rotating shafts in XY may be used, or a platform which is movable in horizontal directions may be used.

Figure 8:
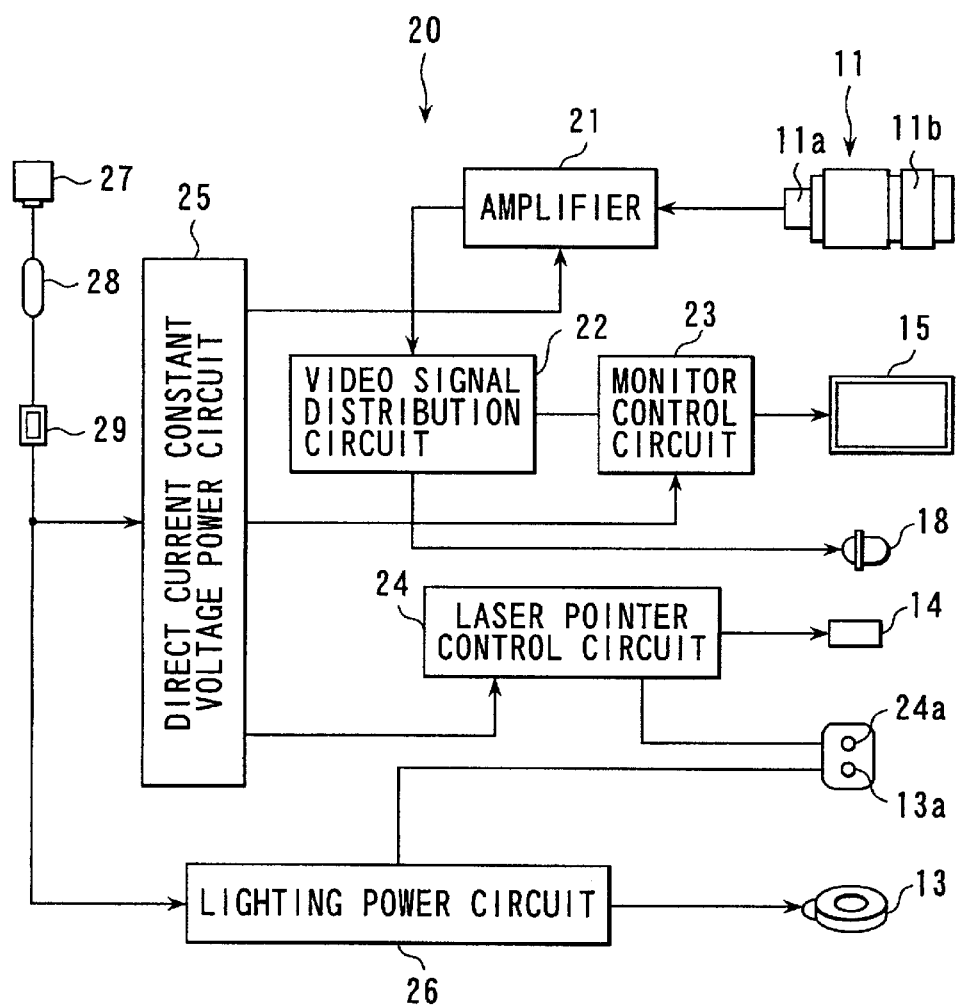
FIG. 8 is a block diagram showing the constitution of an electric circuit in the microscopic three-dimensional object observing microscope of FIG. 1.

FIG. 8 shows the constitution of an electric circuit incorporated below the XY table 16 of the above-mentioned microscopic three-dimensional object observation scope 10.

As shown in FIG. 8, the electric circuit 20 includes an amplifier 21 which amplifies image signals of the CCD camera 11*a*, an image signal distribution circuit 22 which distributes image signals from the amplifier 21, a monitor control circuit 23 which performs a drive control of the liquid crystal display monitor 15 in response to image signals from the video signal distribution circuit 22 so as to display images, a laser pointer control circuit 24 which performs a drive control of the laser pointer 14, a direct current constant voltage power circuit 25 which supplies direct current to the amplifier 21, the monitor control circuit 23 and the laser pointer control circuit 24, and a lighting power circuit 26 which supplies alternating current to the fluorescent lighting device 13 by way of a switch 13*a* and simultaneously supplies alternating current to the laser pointer control circuit 24 byway of a switch 24*a*. Commercial power supply is fed to respective power circuits 25, 26 from an AC power inlet 27 by way of a fuse 28 and a power switch 29.

Here, upon turning on the power switch 29, power is supplied to respective power circuits 25, 26. Accordingly, the direct current constant voltage power circuit 25 rectifies and converts the AC current into a regulated direct current power and supplies this power to the amplifier 21, the monitor control circuit 23 and the laser pointer control circuit 24.

The image signals imaged by the CCD camera 11*a* is amplified by the amplifier 21 and is converted to video signals. Then, the video signals are distributed by the video signal distribution circuit 22 and are inputted to the monitor control circuit 23. Accordingly, images imaged by the CCD camera 11*a* are displayed on the screen of the liquid crystal display monitor 15.

Further, the video signals which are distributed by the video signal distribution circuit 22 may be fed to the outside from the output terminal 18.

Although the video signals (analog RF signals) are outputted from the output terminal 18, signals are not limited to the video signals. For example, S video output signals, analog RGB signals, digital RGB signals, further digital video signals which follows the IEEE 1394 Standard and the like may be outputted.

Further, upon turning on the laser button switch 24a, the laser pointer 14 irradiates laser beams for a given time and stops the irradiation when the given time elapses. Accordingly, only at the time of necessity such as at the time of positioning of the microscopic object 19 placed on the XY table 16 or confirming the observation position or the like, laser beams are irradiated thus preventing unnecessary continuous irradiation of laser beams.

The microscopic three-dimensional object observing microscope 10 has the above-mentioned constitution and is used in the following manner at the time of observing the microscopic object 19.

Figure 9A:
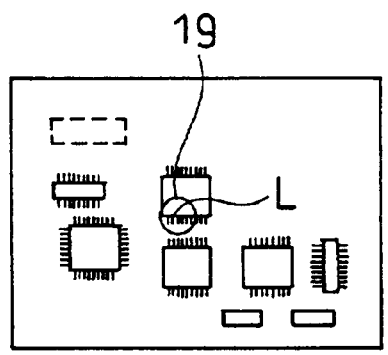
FIGS. 9A to 9C are views showing (FIG. 9A) irradiation of laser beams to a microscopic object, (FIG. 9B) an image for positioning by an imaging part and (FIG. 9C) an image at the time of observation obtained by the microscopic three-dimensional object observing microscope of FIG. 1.

First of all, the microscopic object 19 to be observed is placed on the XY table 16. Then, by manipulating the laser pointer switch 24a shown in FIG. 1, laser beams are irradiated for a given time from the laser pointer 14 as shown in FIG. 9A.

Then, the XY table 16 is finely adjusted in such a manner that laser beams are irradiated to the portion of the microscopic object 19 to be observed. Alternatively, the microscopic object 19 may be directly moved without adjusting the XY table 16.

Figure 9B:
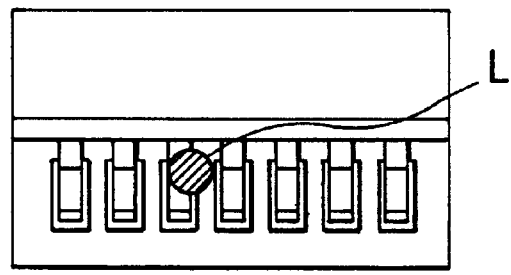

Here, in case the macro zoom lens 11a of the imaging part 11 is adjusted at the low magnification, as shown in FIG. 9B, the whole image or the wide range image of the microscopic object 19 is displayed on the liquid crystal display monitor 15 and hence, positioning of the microscopic body 19 can be carried out easily and rapidly by moving the portion of the microscopic object 19 to be observed toward the center of the screen.

Figure 9C:
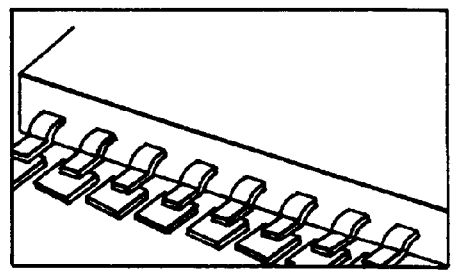

Thereafter, when the macro zoom lens 11b is set at a given magnification with the manipulation of the zoom adjusting lever 11c, as shown in FIG. 9C, the imaging part 11 (see FIG. 1) turns around due to the camera horizontally rotating part 12 (see FIG. 1) and the observation of the microscopic object 19 is performed.

Here, a distance which is approximately as same as the focusing distance of the macro zoom lens 11b is defined between the imaging part 11 and the microscopic object 19 and hence, various operations with respect to the microscopic object 19 can be readily performed while observing the microscopic object 19. At this point of time, since the imaged image is displayed on the screen of the liquid crystal display monitor 15 disposed at the upper portion of the casing 17 as shown in FIG. 1, the moving angle of line of sight between the microscopic object 19 and the monitor screen can be made small and hence, the favorable operability can be achieved.

Figure 10A:
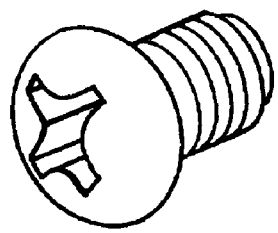
FIGS. 10A to 10C are views showing imaged screens of a screw at (FIG. 10A) 45 degrees from a right oblique direction, (FIG. 10B) a front direction and (FIG. 10C) 45 degrees from a left oblique direction obtained by the microscopic three-dimensional object observing microscope of FIG. 1.
Figure 10B:
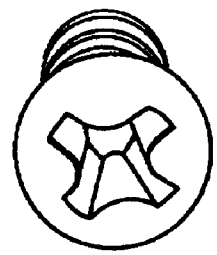
Figure 10C:
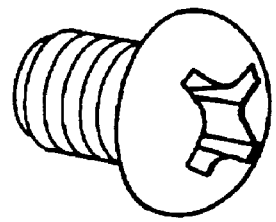

Here, as shown in FIG. 6, when the imaging part 11 is moved by the camera horizontally rotating part 12 from the position which is 45 degrees inclined in a rightward direction to a central position or a position which is 45 degrees inclined in a leftward direction, in case the microscopic object 19 is a screw, as shown in FIG. 10A, FIG. 10B and FIG. 10C, it becomes possible to make the imaging part 11 observe the microscopic object 19 while turning around along the surrounding of the microscopic object 19 without moving the screw to be observed so that the three-dimensional shape of the screw can be readily grasped. Here, the screw is always positioned in the vicinity of the center of the imaging visual field thus facilitating the three-dimensional observation.

Figure 11A:
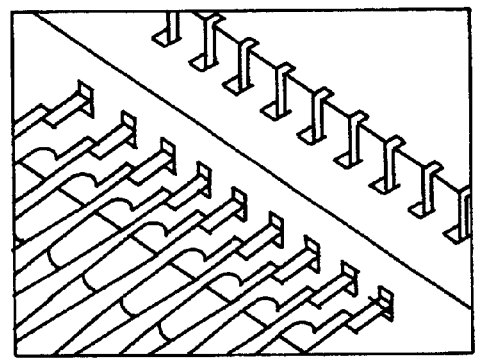
FIGS. 11A to 11C are views showing imaged screens of connector lead portions of a semiconductor device obtained at (FIG. 11A) 45 degrees from a right oblique direction, (FIG. 11B) a front direction and (FIG. 11C) 45 degrees from a left oblique direction obtained by the microscopic three-dimensional object observing microscope of FIG. 1.
Figure 11B:
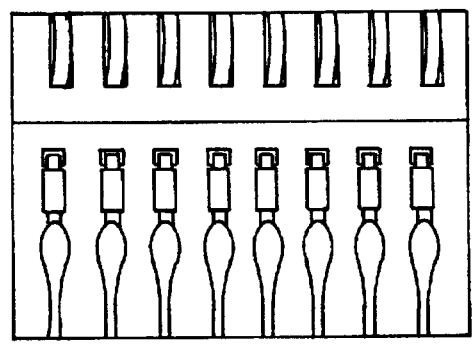
Figure 11C:
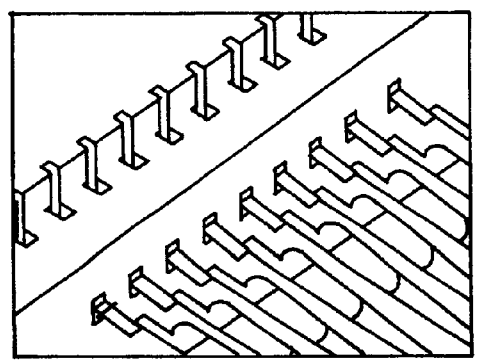

In the same manner, in case the microscopic object 19 is a semiconductor element for surface mounting and the soldered condition of connector leads is to be observed, as shown in FIG. 11A, FIG. 11B and FIG. 11C, it becomes possible to make the imaging part 11 observe the microscopic object 19 while turning around along the surrounding of connector lead portions to be observed so that the soldered condition of each lead to the board can be observed three-dimensionally. Accordingly, the soldering failure such as lifting of solder, bridging or the like can be easily judged and further, J lead type ICs whose IC leads are bent inwardly or bridges located at the lower deep portions of connector parts can be easily observed.

Figure 12A:
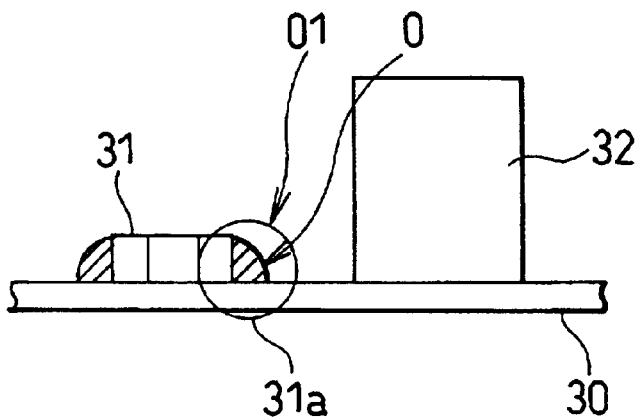
FIGS. 12A to 12C are views showing (FIG. 12A) a side view, (FIG. 12B) an image screen and (FIG. 12C) an image screen obtained by the microscopic three-dimensional object observing microscope of FIG. 1 after an optical axis of an imaging part is moved.
Figure 12B:
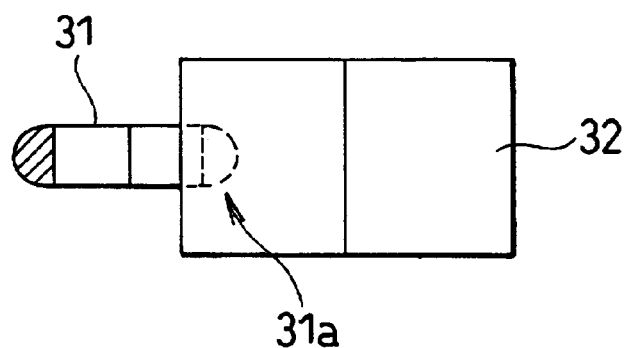

Further, in case of observing a mounting board 30 as shown in FIG. 12A, when an obstacle 32 such as other electronic component is positioned in front of a soldered portion 31a of an electronic component 31 to be observed within the visual field of the imaging part 11, as shown in FIG. 12B, the above-mentioned adjustment screw 12e is fastened so as to increase the inclination angle of the optical axis of the imaging part 11 as indicated by a symbol 01 in FIG. 12A.

Figure 12C:
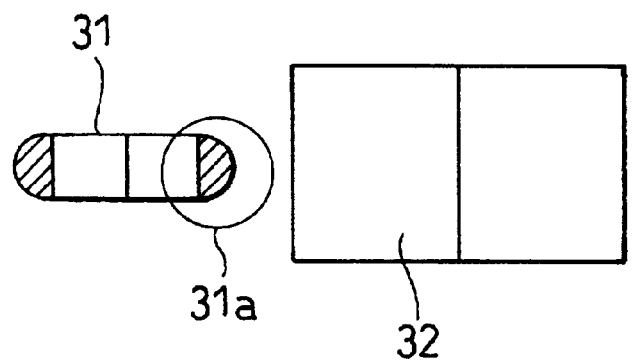

Accordingly, the soldered portion 31a of the electronic component 31 can be observed as shown in FIG. 12C.

Figure 13:
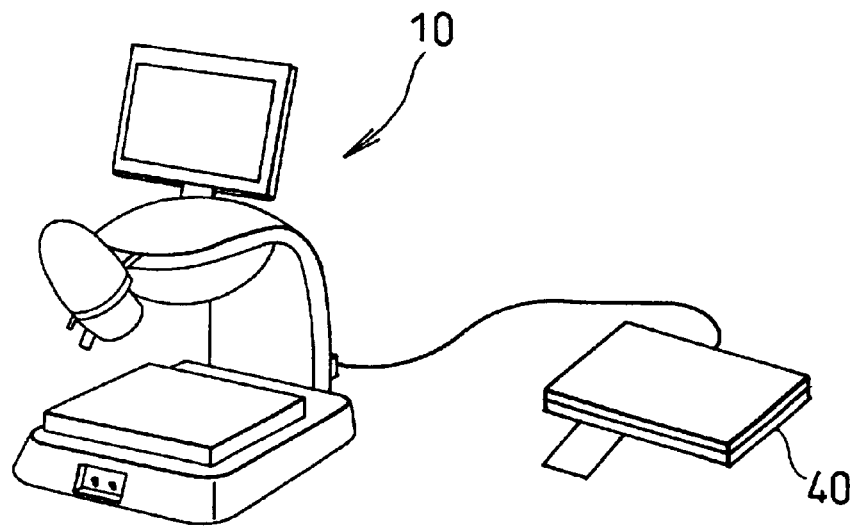
FIG. 13 is a schematic perspective view showing a condition where a video printer is connected to the microscopic three-dimensional object observing microscope of FIG. 1.

Further, as shown in FIG. 13, by connecting a video printer 40 to the above-mentioned microscopic three-dimensional object observing microscope 10, image signals imaged by the imaging part 11 are outputted to the video printer 40 from the output terminal 18. Accordingly, imaged screen by the imaging part 11 can be printed out by the video printer 40.

Figure 14:
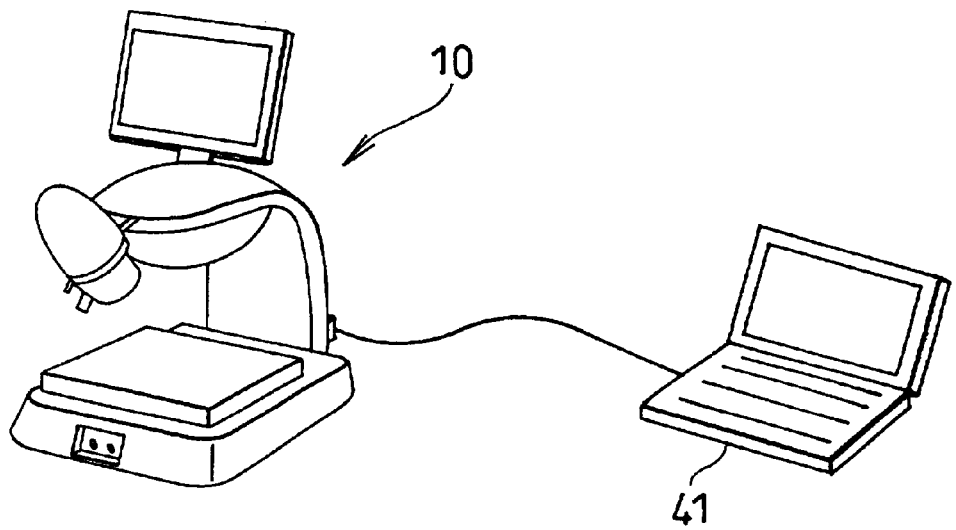
FIG. 14 is a schematic perspective view showing a condition where a personal computer is connected to the microscopic three-dimensional object observing microscope of FIG. 1.

Further, as shown in FIG. 14, by connecting a personal computer 41 to the output terminal 18 (see FIG. 2) as shown in FIG. 14, image signals imaged by the imaging part 11 are taken into the personal computer 41 and the image signals are subjected to suitable image processing by making use of image processing software which are operable on the personal computer 41.

An external monitor may be connected to the output terminal 18. In this case, imaged images are displayed not only on the liquid crystal display monitor 15 but also on the screen of the external monitor so that more people can carry out the observation.

In this case, since the imaging part 11 images the microscopic object 19 from an oblique upward position, the three-dimensional observation of the microscopic object 19 can be carried out easily and, at the same time, since the imaging part.11 images the microscopic object 19 while turning around along the surrounding of the microscopic object 19 by means of the camera horizontally rotating part 12, the three-dimensional shape of a further microscopic object 19 can be explicitly grasped.

Further, all constitutional components of the microscopic three-dimensional observing microscope 10 are integrally incorporated in the casing 17 so that the preparation of the observation becomes unnecessary and the observation can be carried out promptly. Further, the microscopic three-dimensional observing microscope 10 can be moved easily and hence, the observation can be carried out at a moved place promptly.

Further, with the use of the laser pointer, the observation position can be easily recognized with eyes and, at the same time, the observation position of the microscopic object can be easily confirmed.

In this manner, the microscopic three-dimensional object observing microscope 10 of the present invention can be used, for example, for the quality appraisal of jewelry or jewelry articles, the quality assessment of microscopic foods such as rice, the display of microscopic goods at various shows or exhibitions or in show windows or display of microscopic processed products. The microscopic three-dimensional object observing microscope 10 of the present invention can be also used as a tool for exhibition of microscopic articles at museums or art galleries.

Further, the microscopic three-dimensional object observing microscope 10 of the present invention can be used as a fine handwork tool for fine hand work of folk craft, repairing of precision instrument such as watch or camera or handcraft or prickle omission. Further, the microscopic three-dimensional object observing microscope 10 can be used as a tool for medical field, barber or beauty field such as the diagnosis of hair lipid, the diagnosis of skin lipid or the tooth form fabrication or a tool for school education such as the observation of plants, insects or the like, the display of sample product in the lesson, the lecture or the physical and chemistry experiment, or a tool for taking in microscopic object images and a tool for taking in computer image such as a digital microscope camera or the like.

In the above-mentioned embodiments, although the imaging part 11 is constituted such that an inclination angle of approximately 45 degree is made relative to the microscopic object 19, the inclination angle is not limited to this value. Since the same effect can be obtained so long as the vertical observation from right above is excluded, the inclination angle may be set to a range of angle larger than 0 degree and smaller than 90 degrees.

Further, in the above-mentioned embodiment, although the camera horizontally rotating part 12 is designed to rotate the imaging part 11 within an angular range of ±45 degrees with respect to the center of rotation, it is apparent that the rotating angle is not limited to this value and the camera horizontally rotating part 12 may be rotated over the whole circumference.

Further, in the above-mentioned embodiment, although a lens having the shortest focusing distance of 150 mm is used as the macro zoom lens 11b of the imaging part 11, the macro zoom lens 11b is not limited to such a lens. So long as a space which allows operations is assured between the imaging part 11 and the microscopic object 19 at the time of observation, a lens having a different focusing distance may be used and the macro zoom lens 11b is not limited to a zoom lens.

Further, in the above-mentioned embodiment, although the He-Ne red color laser is used as the laser pointer 14, the laser pointer 14 is not limited to this laser. Other laser having a wavelength different in the visible light region from that of the He-Ne red color laser may be used or a spotted light of irradiated from a usual lighting source may be used in place of the He-Ne red color laser.

What is claimed is:

1. A three-dimensional object observing microscope comprising:
   (a) a surface;
   (b) an imaging unit having an imaging lens and an imaging camera for imaging a three-dimensional object which is placed on the surface, from an upper oblique position;
   (c) a casing connected to the surface and supporting the imaging unit;
   (d) a display unit for displaying an image of the three-dimensional object as imaged by said imaging unit, the display unit being integrally formed with the casing;
   (e) a laser pointer formed in the casing adapted to irradiate a laser beam to the three-dimensional object on the surface; and
   (f) wherein the imaging unit can rotate in a plane parallel to the surface.

2. A three-dimensional object observing microscope according to claim 1, wherein said surface is an XY table that is movable in biaxial directions on a horizontal plane.

3. A three-dimensional object observing microscope according to claim 1, wherein the imaging lens of said imaging unit is a macro zoom lens.

4. A three-dimensional object observing microscope according to claim 3, wherein the imaging lens of said imaging unit has a focusing distance of approximately 150 mm.

5. A three-dimensional object observing microscope according to claim 1, wherein said three-dimensional object observing microscope comprises a lighting unit that irradiates lighting light to said three-dimensional object.

6. A three-dimensional object observing microscope according to claim 1, wherein said three-dimensional object observing microscope further comprises a display unit for displaying an image imaged by said imaging part.

7. A three-dimensional object observing microscope according to claim 6, wherein said display unit is integrally supported by the casing.

8. A three-dimensional object observing microscope according to claim 7, wherein said display unit is a liquid crystal display monitor.

9. A three-dimensional object observing microscope according to claim 1, wherein said three-dimensional object observing microscope further comprises a laser pointer which irradiates a laser beams to an observing position on the surface.

10. A three-dimensional object observing microscope according to claim 1, wherein said casing has a rotating mechanism which supports said imaging unit for rotating the imaging part, with the three-dimensional object on the surface as the center of rotation.

11. A three-dimensional object observing microscope according to claim 1, wherein said three-dimensional object observing microscope comprises an angle changing mechanism which changes an inclination angle of said imaging unit relative to the three-dimensional object.

12. A three-dimensional object observing microscope according to claim 1, wherein said three-dimensional object observing microscope comprises an output terminal for outputting an image signal imaged by said imaging unit.

13. A three dimensional object observing microscope comprising a housing having:
   (a) an imaging unit having an imaging unit view axis, the imaging unit having:
      (i) a rotating zoom lens adjustment ring adapted to focus a zoom lens; and
      (ii) a protective barrier mounted at a distal end of the zoom lens;
   (b) a camera mounted on the imaging unit adapted to view an object on an observation surface, the observation surface being moveable in biaxial directions;
   (c) a fluorescent light adapted to shine light on the observation surface;
   (d) a laser pointer formed in the housing adapted to irradiate a laser beam at the observation surface, the laser beam further having a laser beam axis; and (e) a display monitor integrally formed with the housing and adapted to display the image viewed by the camera;

(f) wherein the imaging unit view axis forms an oblique angle to the laser beam axis; and (h) wherein the housing includes a lens arm having:

(i) a first end having an imaging unit supporting portion defining a hole extending from a top end to a bottom end of the unit supporting portion wall and the hole being adapted to receive the imaging unit, the imaging unit supporting portion also having at least one bore extending through a wall of the imaging unit supporting part, the imaging part supporting portion being adapted to adjust the movement of the imaging unit along the bore via at least one of a spring, adjustment screw, and support shaft; and (ii) a second end having a second arm portion having a plurality of plungers connected thereto, the plurality of plungers being adapted to hold the lens arm in a position and move the lens arm into an another position.

14. The three dimensional object observing microscope of claim 13, wherein the second end comprises a chassis, the chassis having a plurality of positioning holes, each positioning hole having a positioning hold diameter that is less than a diameter of the plunger, and wherein the lens arm is adapted to hold the lens arm in place by fitting the plunger into the positioning hole.

15. The three dimensional object observing microscope of claim 14, wherein the plunger comprises a ball bearing and a spring, and the spring is adapted to push the ball bearing of the plunger into the positioning hole.

16. A three dimensional object observing microscope comprising: a housing having:

(a) an imaging unit having an imaging part view axis;

(b) a camera mounted on the imaging unit adapted to view an object on an observation surface, the observation surface being moveable in axial directions;

(c) a fluorescent light adapted to shine light on the observation surface;

(d) a laser pointer formed in the housing adapted to irradiate a laser beam at the observation surface, the laser beam further having a laser beam axis;

(e) a display monitor integrally formed with the housing and adapted to display the image viewed by the camera; and (f) wherein the imaging unit view axis forms an oblique angle to the laser beam axis; and (g) wherein the housing includes a lens arm having an imaging unit supporting portion defining a hole extending from a top end to a bottom end of the imaging unit support portion and the hole being adapted to receive the imaging unit, the imaging unit supporting portion also having at least one bore extending through a wall of the imaging unit support portion, the imaging part supporting portion being adapted to adjust the movement of the imaging unit along the bore via at least one of a spring, adjustment screw, and support shaft.

17. The three dimensional object observing microscope of claim 16, wherein the imaging part further comprises:

a rotating zoom lens adjustment ring adapted to focus a zoom lens of the imaging unit; and a protective barrier mounted at a distal end of the zoom lens.

* * * * *